United States Patent [19]

Graentzel

[11] 4,201,917

[45] May 6, 1980

[54] APPARATUS FOR IRRADIATION OF FLUIDS

[76] Inventor: Alfred Graentzel, Durmersheimer Str. 98, Karlsruhe, Fed. Rep. of Germany

[21] Appl. No.: 924,002

[22] Filed: Jul. 12, 1978

[30] Foreign Application Priority Data

Jul. 23, 1977 [DE] Fed. Rep. of Germany ....... 2733344

[51] Int. Cl.² ............................................ G01N 21/24
[52] U.S. Cl. .................................. 250/431; 250/432 R; 250/435
[58] Field of Search ............... 250/431, 432, 438, 436, 250/515; 51/332, 374; 21/DIG. 2

[56] References Cited

U.S. PATENT DOCUMENTS

| 2,624,010 | 12/1952 | Chamberlain et al. | 250/436 |
| 4,002,918 | 1/1977 | Graentzel et al. | 250/431 |
| 4,017,734 | 4/1977 | Ross | 250/431 |

*Primary Examiner*—Bruce C. Anderson
*Attorney, Agent, or Firm*—Klaus J. Bach

[57] ABSTRACT

Apparatus for irradiation of fluids comprising a container having supported therein a rotor spaced from the container to provide a fluid flow path from an upper fluid inlet to a fluid outlet at the lower end of the container. The rotor is preferably hollow and a radiation source is disposed in the rotor whose upper portion is impermeable to the radiation of said source to shield the fluid in the upper part of the flow path. A carrier gas inlet is arranged at the lower end of the shielded path area and a gas discharge outlet is arranged at the top of the container for removal of the carrier gas together with any gases driven out of the fluid by the carrier gas. At its lower end, the container has a second gas discharge outlet for the removal of gases generated in the lower portion of the flow path by irradiation of the fluid. With this arrangement, the lower discharge outlet carries, besides the known carrier gas, only gases generated by the irradiation of the fluid.

7 Claims, 2 Drawing Figures

U.S. Patent
May, 6, 1980
4,201,917
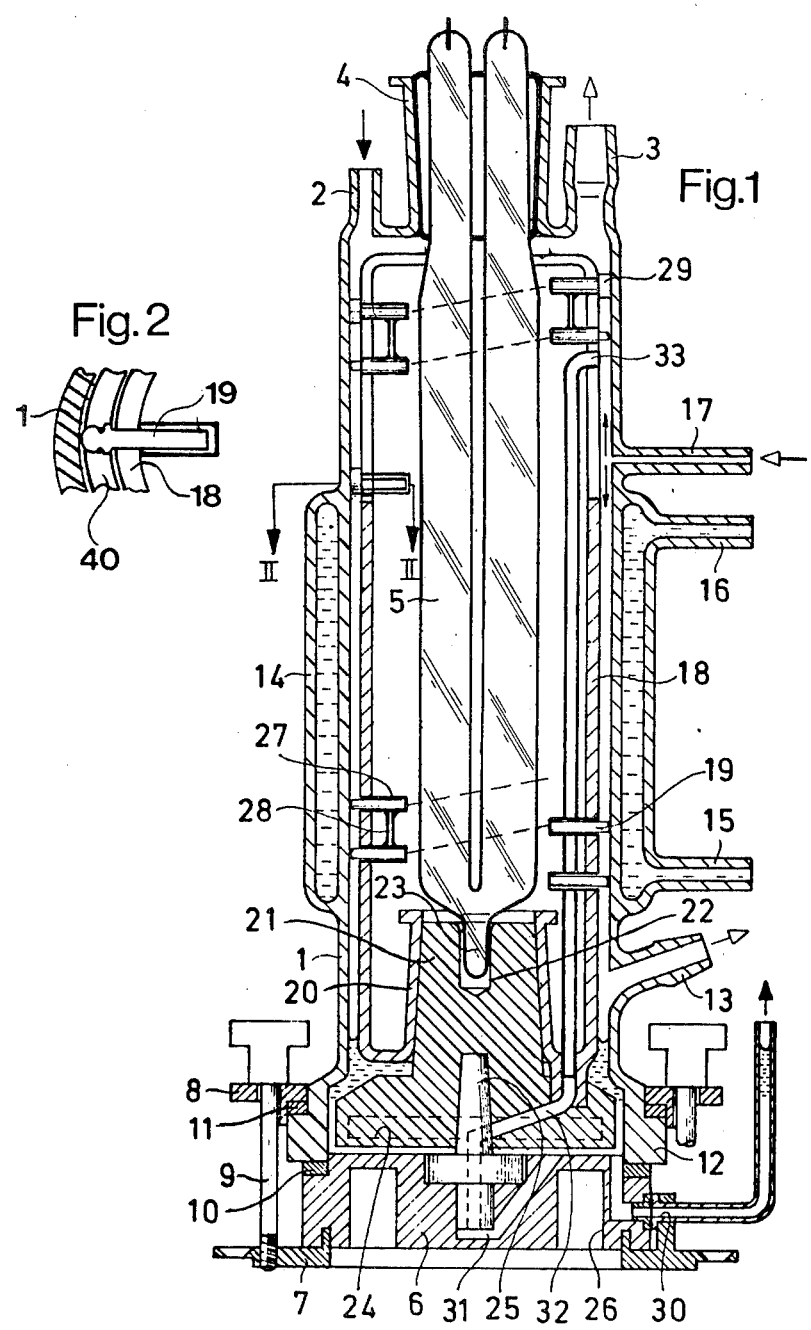

APPARATUS FOR IRRADIATION OF FLUIDS

BACKGROUND OF THE INVENTION

1. Field of the Invention

The invention relates to an apparatus for the irradiation of fluids to achieve chemical reactions in the fluid when conducted through the apparatus.

During quality testing of fluids, diluted or undiluted, especially of water, it is necessary to determine exactly the quantity of any gaseous reaction products, particularly $CO_2$. Proper determination of the amount of gaseous reaction products, however, is difficult, especially because gases, such as $CO_2$, may be in the fluid already before its irradiation. Removal of these gases from the fluid during or after its irradiation together with similar gases generated during the irradiation will result in a faulty analysis indicating a greater amount of gases in the fluid than actually generated by the irradiation.

2. Description of the Prior Art

To cause chemical reactions by irradiation, compounds to be irradiated are conducted in fluid form through an apparatus including a container having walls which are permeable for the particular radiation, the radiation source being arranged at the outside of the apparatus and the radiation therefrom passing through the walls of the apparatus to irradiate the fluid therein.

Such an apparatus for the irradiation of fluids is shown in applicant's U.S. Pat. No. 4,002,918. The apparatus has walls that are permeable for the radiation to be applied to the fluid in an apparatus and a rotor is arranged in the apparatus and provided with wiping elements for cleaning the inner surface of the apparatus walls from deposits which would absorb the radiation.

SUMMARY OF THE INVENTION

An apparatus in which fluids are irradiated for the generation of gases comprises a container of essentially circular cross-section surrounding a rotor which is spaced from the container to form a flow path for the fluid introduced into the container through an upper fluid inlet and removed therefrom through a lower fluid outlet. An ultraviolet lamp is associated with the container for the irradiation of the fluid in the lower part of the flow path, the upper part of the flow path being shielded so as to prevent irradiation of the fluid therein. A carrier gas inlet is arranged at the lower end of the shielded path area, the carrier gas entering said gas inlet driving gases out of said fluid in said shielded area for removal through a gas discharge outlet at the upper end of the container. Gases generated by irradiation in the lower unshielded path area are discharged through a gas discharge outlet at the lower end of the container and gathered for analysis.

With this apparatus, any removable gases are driven out of the fluid before the fluid is exposed to the irradiation and are removed from the apparatus separately from the gases generated in the fluid during irradiation so that the gases generated by irradiation can be accurately measured.

BRIEF DESCRIPTION OF THE DRAWINGS

FIG. 1 shows the apparatus according to the invention schematically in axial cross-section; and FIG. 2 is a cross-sectional view along lines II—II of FIG. 1.

DESCRIPTION OF THE PREFERRED EMBODIMENT

The apparatus consists of a cylindrical glass container 1 with vertical axis which has, at its upper end, an inlet 2 for the introduction of liquids to be treated and an outlet 3 for the discharge of removable gaseous compounds driven from the liquid and removed from the apparatus together with a carrier gas or a reaction causing gas supplied to the liquid in the apparatus. At its top center, the apparatus has a neck 4 for the insertion and support of a tubular U-shaped ultraviolet lamp 5.

At its lower end the container 1 has a flange portion 12, to which an intermediate structure 6 is clamped by means of an annular bottom plate 7, a clamp ring 8 and bolts 9. Between the flange portion 12 and the intermediate structure 6, there is a seal gasket 10. A gasket 11 is also disposed between the clamp ring 8 and the flange 12 to avoid damage to the glass cylinder 1 upon clamping. At its lower end, the container 1 has a second gas discharge outlet 13 which is upwardly inclinded. Around its center portion, the cylindrical container 1 has a cooling jacket 14 with in—and outlets 15, 16 for a coolant and immediately above the cooling jacket 14 the container is provided with a gas inlet pipe 17.

Within the container 1 there is a hollow cylindrical rotor 18 which has radial openings for the reception of pin-type wiping elements 19. The rotor 18 is somewhat smaller in diameter than the container 1 so as to form therebetween a flow path for the liquid to be treated. At its top end, the rotor 18 has a central opening through which the ultraviolet lamp 5 extends into the interior of the hollow rotor 18 so that the radiation generated by the lamp 5 is practically fully applied to the liquid layer in the path surrounding the rotor. As a result of the relatively small radiation losses, the radiation source may be relatively small in output and size.

At its lower end, the hollow cylindrical rotor 18 has a conical axially inwardly projecting central section 20 into which conical support plug 21 is fitted which may consist of plastic. The plug 21 has a central bore 22 in which a tenon 23 of the lamp 5 is supported. The support plug 21 also includes rod-type magnets 24 and a bearing trunnion 25 which is rotatably supported in the intermediate structure 6. The intermediate structure 6 has an annular recess 26, receiving the coupling magnets of a drive means (not shown) for rotating the rotor 18.

The radial openings in the rotor 18 for supporting the wiping elements 19 are formed by sleeves 27 melted at their radially outer ends to the relatively thin walls of the hollow rotor, the sleeves being closed at their radially inner ends and interconnected by straps 28. At least the uppermost row of wiping elements 19 have heads 29 at their radially outer ends, which heads serve as bearing portions for rotatably supporting the rotor 18 in the container 1.

The rotor 18 comprises two sections: The lower section representing about 75 to 80% of the rotor length and extending about up to the gas inlet 17 consists of a synthetic quartz glass which is permeable for UV radiation; and the remaining upper part of the rotor 18 consists of a glass opaque for UV radiation so that the upper part of the container or rather the liquid in the path between the rotor 1 and the container around the opaque rotor portion is not exposed to the UV radiation of the lamp 5.

In order to more effectively shield the upper part of the container 1, and especially to prevent reflection of the radiation into the upper part, there is an opaque strip 40 (FIG. 2) associated with the wiping elements 18 at the lower end of the opaque portion of the rotor 18 just below the gas inlet 17 which surrounds the rotor and interconnects the wiping elements in a helix pattern. The width of the strip 40 is about equal the width of the flow path between the rotor 18 and the container 1. It is engaged in slots at the ends of the pins 18. Two windings are sufficient to shield the upper part of the housing from radiation. The strip 40 however is arranged with respect to the direction of rotation of said rotor so as to act also as a pump for moving the liquid from the upper portion of the container 1 to its lower portion where it is exposed to UV radiation.

For the removal of the irradiated fluid from the apparatus, the intermediate portion 6 has a discharge pipe 30. There are further recirculation conduits 31, 32 provided for returning the fluid to the upper part of the apparatus in a manner known from applicant's earlier U.S. Pat. No. 4,002,918.

OPERATION

During operation, the centrifugal forces generated by the rotating rotor 18 cause the pins 19 to abut the inner walls of the container 1 thereby removing any deposits therefrom. At the same time, however, turbulence is generated in the liquid which enters the container through the inlet 2 and flows downwardly along the container walls, the turbulence accelerating the reactions in the liquid caused by the ultraviolet irradiation from the lamp 5. No radiation-produced reactions, however, take place in the upper part of the container where the liquid is not exposed to the irradiation; rather, in the upper part gases such as $CO_2$ usually contained in water for example, are driven out of the liquid. For this purpose, a carrier gas such as air, oxygen, nitrogen, or other gases or gas mixtures are introduced into the apparatus through the inlet 17 and some of the carrier gas together with the gas driven out of the liquid is removed from the apparatus through outlet 3. The remaining part of the carrier gas moves downwardly from the inlet 17 to the discharge outlet 13.

The actual reaction, in which particularly any hydrocarbons contained in the water are converted to gaseous compounds, commences below the inlet 17 where the liquid is exposed to the UV radiation. The gaseous reaction products so generated are discharged through discharge outlet 13 where they can be accurately measured since the carbon containing gases ($CO_2$) not generated by UV irradiation have been removed earlier. In this manner, it is possible to measure separately inorganic and organic compounds contained in a liquid.

If it is desired to recirculate the liquid in the container 1, the speed of the rotor is simply increased until the centrifugal forces are large enough to lift the liquid in the recirculation conduit 32 to its upper exit end 33.

I claim:

1. Apparatus for the irradiation of fluids to cause a chemical reaction therein, said apparatus comprising: an axially symmetrical container having its axis disposed during operation in a vertical position; a rotor centrally supported within said container for rotation therein, said rotor being spaced from the inner surface of the container so as to form a flow path of annular cross-section for receiving the fluid to be irradiated and having wiping elements adapted to remove any deposits from the inner surface of said container, said container having a fluid inlet at its upper end; and a fluid outlet at its lower end; a radiation source disposed adjacent said flow path; shielding means arranged at the inlet end portion of said container between said source and said flow path and extending downwardly from the upper end of said container a predetermined distance for shielding the fluid in said flow path from irradiation by said source; gas discharge outlets at the opposite axial ends of said container, and a gas inlet arranged at the lower end of said shielding means for the admission of a carrier gas providing for upward and downward gas flow zones within said container from said gas inlet to said gas outlets, the upper gas outlet serving to discharge gases containing carbon of inorganic origin driven out of the fluid in the shielded section of said flow path and the lower gas outlet serving to discharge gases containing carbon of organic origin generated by irradiation of the fluid in an unshielded section of said flow path at the lower end of said container so as to permit distinct measurement of organic compounds in the fluid.

2. Apparatus as recited in claim 1, wherein said rotor is a hollow cylindrical body, and said radiation source is disposed within said rotor, at least the lower portion of said rotor consisting of a material which is permeable for the radiation of said source.

3. Apparatus as recited in claim 2, wherein the upper part of said rotor consists of a material which is opaque to the radiation from the radiation source therein.

4. Apparatus as recited in claim 2, wherein at the lower end of said shielding means the rotor is provided with a strip which surrounds the rotor in the form of a helix and which extends essentially across the flow path between the rotor and the container walls and is opaque to the radiation of said source.

5. Apparatus as recited in claim 2, wherein said rotor has a plurality of axial sleeves extending radially into the interior of said rotor and having closed inner ends and wherein said wiping elements are pins axially movably disposed in said sleeves, said sleeves being interconnected by support straps.

6. Apparatus as recited in claim 5, wherein at least some of said pins at least at one end of said rotor are provided with heads providing a bearing structure for said rotor in said container.

7. Apparatus as recited in claim 4, wherein said strip extends between circumferentially adjacent wiping elements and is supported thereby.

* * * * *